Nov. 28, 1933.  C. B. HIGGINS  1,937,343
RADIATOR
Filed Dec. 7, 1932
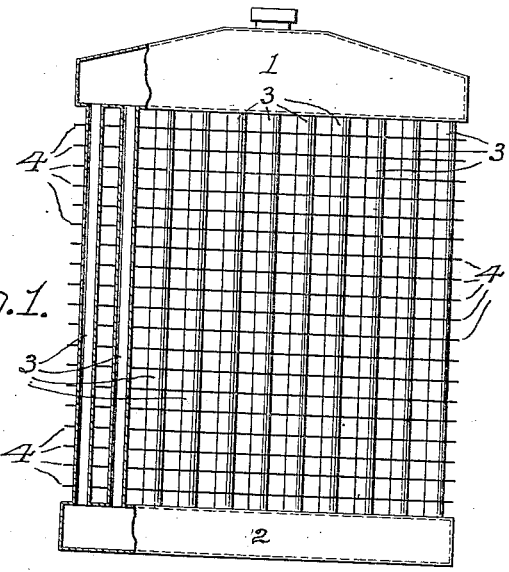
Fig. 1.
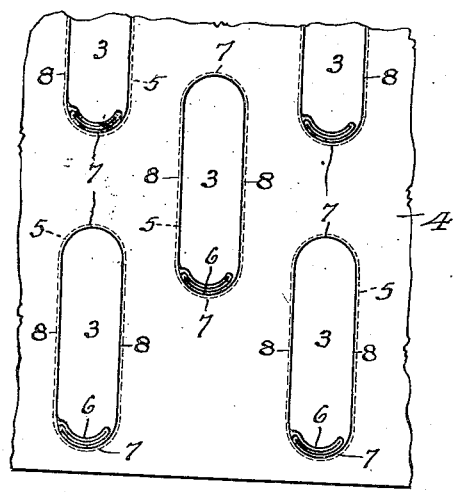
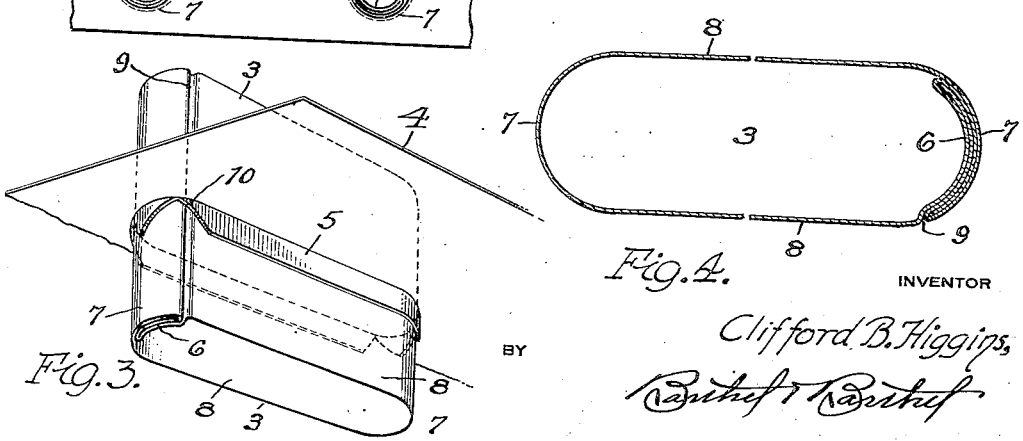
Fig. 3.  Fig. 4.
INVENTOR
Clifford B. Higgins,
BY
ATTORNEYS Patented Nov. 28, 1933

1,937,343

UNITED STATES PATENT OFFICE 1,937,343

RADIATOR

Clifford B. Higgins, Detroit, Mich., assignor to H. & H. Tube & Mfg. Co., Detroit, Mich., a corporation of Michigan Application December 7, 1932. Serial No. 646,066

2 Claims. (Cl. 257—130)

This invention relates to motor vehicle radiators of the tube and fin type, and an object is to provide a construction wherein cooling of the fluid passing through the tubes, is enhanced by a more effective contact of fins with tubes, and the danger of the tubes becoming obstructed by sediment, etc., is reduced, thus insuring a free flow through each tube.

A further object is to provide a tube of oblong form in cross section and limited cross sectional area, which is especially adapted for use in this particular class of structures, and wherein each tube is reinforced throughout the length of one of its narrow sides to resist rupture in case of impact against such side, and to provide a lock seam tube, the outer surface of which is smooth except for a very restricted groove along the seam in said narrow side, such smooth exterior promoting effective contact of fins with tube surface, and the construction facilitating the insertion of the tubes through the flanged openings provided therefor in the fins.

It is also an object to provide a lock seam tube of small cross sectional area and oblong form which is adapted for use in such radiator structures and wherein the interior of the tube is so unobstructed by its seam that a suitable tool or mandrel may be readily inserted therein to stiffen the tube during the operation of pushing said tube through the flanged openings provided therefor in the fins, the seam of the tube, because of its location at the narrow side of the tube, permitting the use of a tool or mandrel for the purpose, which is of substantially the same cross sectional area as that of the interior of the tube to fit closely therein and is, therefore of sufficient stiffness and strength to effectually withstand the strains imposed thereon in inserting the tube through the fins, thereby preventing bending, buckling or other distortion of the tube.

A further object of the employment of tubes which are each formed with a seam in the narrow side thereof, is that a considerable saving in tube metal is effected as the tube may be formed from a narrower strip than it otherwise could be, and an efficient lock seam of less width may be formed, due to the position of the seam at this narrow side of the tube, and further, a saving in solder is effected, as there is no comparatively deep groove in the flat extended side of the tube, which groove, in the usual tube construction, must be filled with solder in order to effectually attach the fins to the tube and give proper heat conductivity, and in order to do this, a thicker coating of solder on the exterior of the tube is necessary, which comparatively thick coating, also tends to cut down heat conductivity and lessen the cooling action.

Other objects and advantages of the present construction will be apparent from the following description and drawing, wherein—

Figure 1 is a front elevation of a radiator illustrative of an embodiment of the present invention and showing portions broken away and in section to more fully disclose the construction;

Fig. 2 is a detail plan view of a portion of a fin with tubes shown in place within openings therein;

Fig. 3 is a perspective view of a portion of a tube and fin with the tube inserted within a flanged opening in the fin; and Fig. 4 is a detail cross sectional view of one of the tubes.

In Figure 1 of the drawing, a motor vehicle radiator is illustrated comprising the usual top tank 1 and bottom tank 2, which tanks are connected by a plurality of vertical tubes 3 so that the water for cooling the internal combustion engine (not shown) may circulate through these tubes, and in doing so, become cooled by outside air drawn through the radiator between said tubes, the cooling effect being increased by fins 4 or very thin copper sheets formed with openings to receive the tubes, these fins being strung upon the tubes in spaced apart relation, each opening in each fin being flanged as at 5 (Fig. 3) to provide intimate contact between tube and fin so that the heat of the water passing through the tubes will be quickly dissipated through the conductivity of the fins.

Tubes for radiators are commonly of limited cross sectional area and oblong form, being for example, .535 in cross sectional length and .093 in width, and constructed with a lock seam formed in one of the flat sides of the tube centrally thereof and extending the full length of the tube. This seam projects inwardly from the side in which it is formed, thus greatly decreasing the space within the tube between said sides. This seam projecting into the tube, thus decreases the narrow clear space between the flat sides of the tube to such an extent as to form a decided obstruction and to greatly increase the liability of solid matter carried by the water, to bridge across from this seam to the opposite side of the tube, thus further increasing the obstruction to the free flow of water through the tube.

Where the tubes are formed, as in the present construction and as shown in Fig. 4, with the lock seam 6 located at one of the narrow sides 7 of the tube, it forms no material internal obstruction, nor does it aid in bridging across between the plain flat sides 8 of extended and unbroken area. Further, this seam 6 extends nearly the full width of this narrow side 7 of the tube and as such seam is formed by folding the two edge portions of the very thin metal, each upon itself and interlocking these folded portions flat against the inner surface of the tube wall, the wall of this side 7 then consists of four thicknesses of the metal, making it strong and rigid and its outer surface practically continuous. It will be noted that these tubes may, if desired, be placed with the seamed side 7 toward the front of the radiator so that if this side be accidentally struck, the front sides of the tubes will withstand the impact unless it be so great as to practically disrupt the entire structure.

By forming the seam at the narrow side 7 of the tube instead of centrally of one of the flat sides 8, an efficient seam which is of less width may be provided, due to the location and transverse curvature of the seam which curvature not only gives a better lock but also assists in soldering the seam, the flux and solder entering the seam with greater facility due to such location and curvature. This narrowing of the seam effects a very material saving in metal as a strip of lesser width may be used to form the tube and a coating of solder of lesser thickness on the exterior of the tube may be employed as it is not necessary to use a coating more than otherwise required, in order to insure complete filling of the groove 9 along the seam as this groove, due to the location of the seam interiorly of the tube, comes at a point where the break 10 in the flange 5 occurs. A comparatively thin coating on the tube is all that is necessary to firmly attach the flange of the fin to the two flat sides of the tube which are of extended area, thereby giving the desired conductivity from tube to fin, and as solder is of less conductivity than the metal of the tube, the thinner the coating, the better the heat radiation.

It might be stated that the solder coating on the tubes is necessary as this is the only practical way in the manufacture of these structures, in which the fins may be effectually soldered to the tubes, the entire core, after the insertion of the formed tubes through the fins, being placed in an oven and heated to the proper temperature to cause the solder to flow.

Further, in assembling the tubes and fins of a radiator of this class, in order to insert the tubes through the openings in the fins with facility and without danger of bending or otherwise distorting the tubes, it is necessary to insert a stiffener or mandrel within the tube and by placing the seam 6 at the narrow side 7 of the tube and flat against the inner surface of said side, the interior of the tube between the flat sides 8 is left free from obstruction so that a mandrel may be used which will fit the interior of the tube, thus permitting the use of a mandrel which is much more rigid, strong and stiff and the insertion of such mandrel within the tube is facilitated. Further the removal of the seam from the side wall to the narrow side 7, removes the groove or gap 9 of the seam from the plain flat side of the tube to the narrow side where the contact between fin and tube is always the least due to the break or breaks 10 in the flange 5 which always occur at the ends of the openings in the fins. Therefore a very material advantage is secured as the two plain flat sides of the tube are left free of all breaks or depressions, giving perfect contact between these sides and the unbroken portions of the fin flange, thus promoting the efficiency of the radiator as there is more actual metallic contact of fins with tubes.

It has been proven in actual tests that, where a radiator employing the usual form of tubes is used, a whistling sound is emitted, due to the passage of air under high velocities, over or across the groove or gap alongside the seam in the side of each tube. This whistling sound is eliminated by forming the seam 6 in the side 7 of each tube, as, in that case, whether the groove 9 be at the front or back of each tube, the air is deflected and does not produce this noise in passing the groove.

By forming the interlocked portions of the seam inwardly of the tube wall and flat against the inner surface of said wall, a smooth exterior curved surface which is substantially continuous around this side 7, is provided having no projections to catch upon fins in inserting the tubes through the openings therein, and the smooth rounded exterior side surface is continuous with the outer surface of the sides 8 except for the groove 9 which is located at the end of one of the sides 8.

Obviously a radiator constructed as shown and described has many advantages in both efficiency and facility of assembly, over radiators of the fin and tube type as commonly constructed, and while a particular form of lock seam is shown, it is obvious that other forms of seams and tubes may be employed, and such changes in construction are contemplated as falling within the scope of the present invention.

Having thus fully described my invention, what I claim is:—

1. A motor vehicle radiator comprising a top tank, a bottom tank, a plurality of tubes connecting said tanks, each of said tubes being of limited cross sectional area and oblong form with plain flat parallel sides and narrow ends, said tubes being each formed from a strip of thin sheet metal with the edge portions of said strip each folded upon itself with said folded portions interlocked to form a seam extending the length of the tube with said seam forming the wall of one of the narrow ends of the cross section of the tube, and a plurality of fin plates formed with flanged openings with the said flanges disrupted at the ends of each opening through which said tubes are inserted with said flanges contacting the flat parallel sides of said tubes and with the disrupted portions of each flange at one end of each opening contacting the seamed portion of the tube extending through said openings.

2. A motor vehicle radiator comprising a top tank, a bottom tank, a plurality of tubes connecting said tanks, a plurality of horizontally disposed thin metal fin plates having flanged openings therein with rounded ends to receive said tubes with the said flanges disrupted at the ends of each opening, each tube being formed of thin sheet metal with the edge portions thereof interlocked to form a seam of a plurality of thicknesses of metal which seam is curved transversely to form a rounded end of each tube in transverse section, said tubes being set in the openings of said fins with the seam of each tube at one end of each opening and opposite the disrupted flange thereof, and a thin coating of solder on the exterior of each tube to unite said flanges of said fins to said tubes.

CLIFFORD B. HIGGINS.